(12) United States Patent
Jäger et al.

(10) Patent No.: US 6,588,564 B1
(45) Date of Patent: Jul. 8, 2003

(54) HUB, ESPECIALLY FOR BICYCLES AND THE LIKE

(75) Inventors: Gerrit Jäger, Péry (CH); Stephan Spahr, Lengnau (CH)

(73) Assignee: DT-Swiss AG, Biel (CH)

( * ) Notice: Subject to any disclaimer, the term of this patent is extended or adjusted under 35 U.S.C. 154(b) by 0 days.

(21) Appl. No.: 09/807,553

(22) PCT Filed: Oct. 15, 1999

(86) PCT No.: PCT/EP99/07838

§ 371 (c)(1),
(2), (4) Date: Jul. 20, 2001

(87) PCT Pub. No.: WO00/21762

PCT Pub. Date: Apr. 20, 2000

(30) Foreign Application Priority Data

Oct. 15, 1998 (DE) .......................... 198 47 673

(51) Int. Cl.⁷ ............................ F16D 23/00; F16D 11/08
(52) U.S. Cl. ..................... 192/64; 192/69.81; 192/89.27
(58) Field of Search ......................... 192/64, 46, 69.81, 192/89.27

(56) References Cited

U.S. PATENT DOCUMENTS

| 2,504,018 A | * | 11/1945 | Gibson | 192/48 |
| 4,580,670 A | * | 4/1986 | Nagano | 192/46 |
| 4,593,799 A | * | 6/1986 | Ozaki | 192/46 |
| 5,632,364 A | * | 5/1997 | Mercat | 192/46 |
| 5,676,227 A | * | 10/1997 | Hugi | 192/46 |
| 5,676,228 A | * | 10/1997 | Lin | 192/64 |
| 5,718,315 A | * | 2/1998 | Chen | 192/45.1 |
| 5,738,197 A | * | 4/1998 | Kroger et al. | 192/46 |
| 5,816,377 A | * | 10/1998 | Nakamura | 192/46 |

FOREIGN PATENT DOCUMENTS

| DE | 9419357 U | 1/1995 |
| DE | 29803667 U | 4/1998 |
| DE | 19731451 A | 1/1999 |
| EP | 0791482 A | 8/1997 |

* cited by examiner

Primary Examiner—Richard M. Lorence
Assistant Examiner—Eric M Williams

(57) ABSTRACT

The invention relates to a hub for bicycles and the like, comprising a hub axle and a hub housing concentrically mounted in relation thereto including a bearing device having at least two bearings mounted between the axle and the housing. A rotor (25) for receiving at least one toothed wheel is disposed on the hub axle (4) and a free-wheel device is arranged between the rotor and the housing of the hub, said device having two toothed discs (22, 23), the toothed surfaces of which are pressed against each other by a pretensioning device. The toothed surfaces of which are pressed against each other by a pretensioning device. The toothed discs are mounted ina substantially concentric manner in relation to the hub axle (4) on planes which are aligned perpendicular to the hub axle. The toothed discs are float mounted or fixed so that the toothed discs can be tilted in relation to the hub axle.

24 Claims, 4 Drawing Sheets

HUB, ESPECIALLY FOR BICYCLES AND THE LIKE

The present invention relates to a hub, which is especially suitable for bicycles.

In addition to bicycles, the hub can be used for other purposes, for example for all types of towing trailers, especially bicycle trailers, for wheelchairs and other such similar contrivances. For the sake of simplicity, however, the invention will be described in the following with reference to its use with bicycles, whereby said description shall not be construed in any way as a limitation of application.

Hubs of the type referred to here serve to connect the stationary wheel axle with the freewheel rotating about said axle. The connection between the hub and the rim of the wheel is made with steel spokes, whereby generally between 24 and 36 spokes are used which are inserted into bores on the hub and the rim in adherence to a given pattern. In addition to said spokes, connections today are increasingly making use of just a small number of, for example, three or four plastic supports, or employing discs such as carbon discs.

High demands are placed on hubs especially with wheels used for sporting purposes, most particularly with wheels used during competitive events. On one hand, a hub should rotate with the least amount of frictional drag possible and on the other hand, it should enable a support as free of play as possible, it should exhibit only slight soiling and wear, and it should be easy to mount and disassemble.

Generally, it is the rear wheel of a bicycle which is driven. To this end, in addition to the actual hub housing, a rotor or driver is also arranged on the rear wheel hub axle, to which one or more gearwheels or sprocket wheels can be firmly mounted in order to transfer the driving force to the rear wheel.

To prevent the front pedal crank from continuing to rotate during a downhill ride, a freewheel is usually integrated into the rear hub, which transfers the driving force of the driver or the rotor from the rotor to the hub housing and thus to the rear wheel while having the effect that the hub housing and the rotor can rotate counter to one another during back-pedaling.

A freewheel which is fast and reliable in the introducing of driving force transferred from the rotor to the hub housing is known in the prior art from German utility model G 94 19 357.6. Meanwhile, friction losses are also relatively slight, if the user does not use the pedal.

This freewheel transfers forward rotor torque via a pair of toothed discs while the gear teeth are disengaged during back-pedaling.

A disadvantage of this freewheel is that a slight tilting of one of the toothed discs leads to greater wear on the more heavily stressed teeth so that durability is limited.

The task of the present invention is to provide a hub for a bicycle which meets the previously mentioned requirements and which, in particular, functions reliably, is easy to dismantle and which has a highly durable life.

This task is solved in accordance with the present invention by the object of claim 1, claim 26, or claim 27. Preferred embodiments of the invention constitute the subject matter of the subclaims.

The present invention provides a hub with high functional reliability and durability since the inventive freewheel contained in the hub achieves a reliable, durable and form-fitting connection during transferring of force while frictional losses occurring, for example during a downhill ride when not pedaling, are slight.

The hub according to the present invention has two bearing means as a front wheel hub and preferably four bearing means as a rear wheel hub. These bearing means are preferably configured as ball bearings, especially preferred is their configuring as grooved ball bearings, whereby it is especially preferable to use low-friction bearings and low-friction lubricants.

In addition to a hub axle which is rotatably mounted relative the hub housing, the hub according to the present invention also has a rotor mounted to be rotatable relative said hub axle and a freewheel device comprising at least two toothed discs arranged or switched between the rotor and the hub housing, said discs being pressed against each other by a pre-tensioning means and configured such that they transfer rotor torque in the direction of travel from the rotor to the hub housing. In a preferred embodiment, the tooth surfaces are arranged on a side surface and engage with one another upon transmission of torque.

The toothed discs are arranged substantially concentric to the hub axle and when assembled accordingly, the discs lie substantially in a plane perpendicular to an axial line of said hub axle, at least in the state of rest.

The toothed discs are of a floating mounting so that a tilting of said toothed discs perpendicular to the axial line relative this plane is possible during operation.

The hub according to the present invention has numerous advantages.

The use of two floating-mounted toothed discs has the advantage that a tilting of the first toothed disc causes a corresponding tilting of the second toothed disc such that the teeth arranged on said toothed discs are always reliably engaged with one another during a transmission of torque.

In a preferred embodiment of the inventive hub, said toothed discs are arranged adjacent to one another and urged together by means of at least one spring, whereby especially preferred is respective springs each exerting pressure against each outer side of the respective adjacent toothed discs. Configuring at least one of these springs as a coil spring is particularly preferred.

Such a configuration has many advantages since using two springs exerting pressure symmetrically from both sides onto adjacent toothed discs results in a symmetrical stressing and since using two springs allows for a quicker reaction at the outset. Consequently, the freewheel reacts faster to the introduction of driving force than conventional freewheels do.

In a further preferred embodiment, the toothed discs of the freewheel are configured to be relatively thin discs, their outer diameter amounting to between 20 and 40 mm; roughly 30 mm is preferred. Disc thickness amounts to between 4 and 12 mm; roughly 8 mm is preferred. A plurality of teeth are arranged on a side or disc surface, whereby the number of said teeth is >2, preferably between 4 and 60, and especially preferred between 6 and 48.

The quick and easy exchanging of toothed discs integrated in the hub is particularly preferred, as is the hub itself being readily opened without great exertion, in order to enable simple and feasibly daily cleaning, as is customary in professional cycling circles.

A greater number of teeth leads to a higher freewheel loading capacity, while friction is smaller with a lesser number of teeth.

When the corresponding toothed discs allow for simple and quick replacement, the user can choose between the individual advantages according to his or her own requirements for use so that toothed discs having a lesser number of teeth can be fitted for rides over even surfaces or at high speeds, while a greater number of teeth is more auspicious for uphill or cross-country rides since the loading capacity is greater.

In another preferred embodiment of the inventive hub, the teeth of the toothed discs are arranged on an annular section of the disc or side surface, wherein arranging the teeth on one of the outer annular areas of the toothed disc is especially preferred.

Two toothed discs are employed in a preferred embodiment of the inventive hub which are essentially similar or identical or manufactured in such a way that with two toothed-discs arranged with their tooth surfaces directly adjacent, at least a part of the teeth of one of said toothed discs engages in the recesses between the teeth of said second toothed disc, whereby the number of teeth of said two toothed discs may either be identical or different.

This constitutes a further advantage of the hub according to the present invention since the effect described above can be achieved by switching the toothed disc: employing a toothed disc with a lesser number of teeth reduces friction, employing a toothed disc with a greater number of teeth increases resistance.

The individual teeth are preferably configured to be asymmetrical. A long, flat incline having an angle of inclination of 5–30°, preferably at about 11°±1°, forms one flank; the second flank of the tooth has an obtuse angle of about 100° to the disc surface.

Upon a transmission of torque in the direction of travel, the toothed discs are pressed together by the pre-tensioning means and the steep flanks of the teeth transfer the torque.

When back-pedaling, the flat ascending sides of the teeth slide past each other, disengaging the toothed discs.

In a further embodiment of the hub according to the present invention, the side surfaces of the toothed discs are configured such that two contacting toothed discs are essentially in contact over a major portion of the disc surfaces.

In further embodiment of the inventive hub, the toothed discs are disposed with a plurality of projections distributed about the circumference of their outer surface in the radial direction which form a further radial gearing and which exhibit in the radial direction a triangular, rectangular, sinusoidal, trapezoidal or toothed-shaped cross-section in a plane of said toothed surfaces.

In another embodiment of the present invention, one of said toothed discs is essentially non-rotatably arranged in a substantially concentric bore or opening in the rotor arranged to align to the center of the hub in the corresponding assembly, and said rotor opening is configured such that said projections of said toothed discs extend into the radial recesses of said rotor.

In the hub housing of the corresponding assembly, a bore or opening is arranged in substantially concentric alignment toward the rotor in which a threaded ring comprising a bore is screwed into said hub housing, a toothed disc essentially non-rotatably arranged in said bore. Said bore in the threaded ring is preferably configured such that the projections of the toothed disc project into the radial recesses of said threaded ring.

These embodiments are particularly advantageous since one toothed disc is arranged non-rotatably in the rotor, while the other toothed disc is arranged non-rotatably in the hub housing. When contacting one another, a forward torque can be transferred from the rotor to the first toothed disc, from there to the second toothed disc, and from the second toothed disc to the hub housing.

The bore in the rotor and the bore in the threaded ring are preferably configured such that they are suited to receive only one toothed ring, effectively making it impossible for the toothed ring to switch from one of said holes to the other.

In all of the embodiments described thus far, the toothed discs are designed for a predefined maximum number of teeth. In a toothed disc having this maximum number of teeth, the teeth are evenly distributed circumferentially on the side surfaces, whereas while a toothed disc which has a lesser number of teeth has certain teeth omitted, the existing ones lie on the same grid as a toothed disc having the maximum number of teeth.

The circumferential spacing can vary from-tooth to tooth, at least in the case of a toothed disc having a number of teeth which cannot be determined from integral division of said maximum number of teeth.

A toothed disc with less teeth than the maximum can be fabricated in that certain teeth be omitted preferably in symmetrical distribution across the circumference, so that the circumferential spacing from one tooth to the next at these points is larger than at other points.

This configuration is of particular advantage since this measure allows toothed discs having almost any, even differing, numbers of teeth to be coupled with one another.

In a further embodiment of the hub according to the present invention, the rotor can be removed manually without the need for any special tool.

This is especially advantageous since it is particularly simple for a user to exchange gearwheels.

In a preferred embodiment of the inventive hub, the threaded ring is made of a metal alloy, preferably a light metal alloy; an aluminum alloy is especially preferred.

A light metal or an aluminum alloy is especially advantageous since this reduces the weight.

At least a part of the areas which transfer force in the hub may be, for example, additionally tempered through a surface treatment or similar measure. This is especially advantageous since it increases the service life and load capacity of the components.

A preferred embodiment of the invention provides a hub having high functional safety, since the sealing means provided in accordance with the invention prevents the entry of water and dirt into the hub body and especially prevents influx into the bearing means, or at least hinders same to the greatest possible extent.

The phrase "hinders to the greatest possible extent" was chosen for the reason that a seal of this type can never be absolutely tight in the literal physical sense. The seal is, however, especially in the preferred configurations described in the following, designed such that infiltration of moisture and dirt is not possible during normal use nor during customary cleaning procedures.

According to a preferred embodiment, the sealing means is configured as a labyrinth seal. "Labyrinth seal" is to be understood as a seal in which the sealing surfaces moveable relative one another do not touch, but rather form a small seal gap inbetween. Said seal gap undergoes at least one change of direction, preferably several deflections, in fact preferably at an angle of about 90°, so that infiltration of liquid or dirt is basically impossible when a sufficiently constricted seal gap is chosen.

The use of a labyrinth seal has the advantage that the seal is not damaged or rendered ineffective even upon direct impact from a jet surge of water. Mountain bikes in particular are regularly cleaned after off-road use using a high pressure cleaner which sends water impacting the parts to be cleaned at a pressure of up to 150 bar. The multiple deflections to the labyrinth seal gap enable the water pressure created by the impact to be rapidly and reliably, degraded so that said pressure does not damage the seal and the water cannot penetrate to the bearings nor the hub interior.

In order to achieve a good sealing effect, it is preferable to have 3 or 4 deflections of roughly 90°. It is, however, also possible to provide fewer or more deflections.

According to another preferred embodiment, the sealing means is configured as an elastomer seal having an elastic lip and especially preferred is configuring the seal in essentially a V-shape. Hereby it is preferable to design the part which moves relative to the part to be sealed relatively thin so that an overlain elastic sealing surface or sealing lip exerting a relatively high pressure per surface area is attained which still generates only a low moment of friction.

According to an especially preferred embodiment, the sealing means comprises both a labyrinth seal as well as also an elastomer seal. In this case, it is preferable that the elastomer seal is downstream the labyrinth seal; it is however also possible that this order be reversed. Downstream refers to the elastomer seal being closer to the bearing and the labyrinth seal being farther away from the bearing and aligned toward the surroundings.

This results in the advantage as described above of greatly restricting the infiltration of water and dirt through the labyrinth seal even, for example, when employing a high-pressure cleaner, and that any possible residual amounts of fluid which could conceivably gain entrance to the hub through the labyrinth seal are prevented from penetrating on through to the bearing by the elastomer seal.

It is further preferred, particularly when making use of a labyrinth seal, to configure the sealing gap and all surfaces coming into contact with said sealing gap such that the centrifugal force generated by the rotation of the hub body can be used to expel any water which has penetrated the labyrinth seal back outside.

Also in the case of a combination of a labyrinth seal with a downstream elastomer seal, the surfaces of the seal gap and the surfaces of the elastomer seal are accordingly configured so that the conveying of infiltrated water back outward functions in a simple and reliable manner.

Particularly when using such a hub in competitive situations, it is absolutely essential that the hub be regularly dismantled despite good sealing effect in order to ensure that the bearings are in optimal condition. Complicated special tools are at times required to enable dismantling of conventional hubs, impeding regular maintenance.

The present invention therefore proposes structuring the hub such that it can be dismantled without the need for any tools, or at least for the most part without tools, or at least without the need for any special tools.

This is achieved according to a preferred embodiment of the invention in that the bearing is retained by a stopper element which itself is preferably retained only by friction. Said stopper element is preferably designed rotationally symmetrical to the axle itself and slid onto same whereby the retaining function is then generated by means of a frictional resistance between said stopper element and axle. The retaining function is preferably created by means of a gasket, preferably a conventional O-ring, which simultaneously affects a sealing relative stopper element and axle.

This configuration has the advantage that the stopper element with the sealing ring can be positioned on the axle and removed from same without the need for tools. At the same time, the corresponding configuration of the sealing ring allows for attaining a high moment of retention in order to hold the stopper element securely to the axle.

It is pointed out only for the sake of completeness that the stopper element in this configuration is structured such that it is retained at the inner side of the drop-outs in which the hub is held in the front wheel fork, respectively in the rear construction when the hub is in mounted state, and thus secured by the fitted screw connection, respectively quick-release means retaining the axle and hub in the drop-out.

Further advantages, features and application possibilities of the present invention will now ensue from the following description of an embodiment making reference to the drawings, which show.

Figure 1:
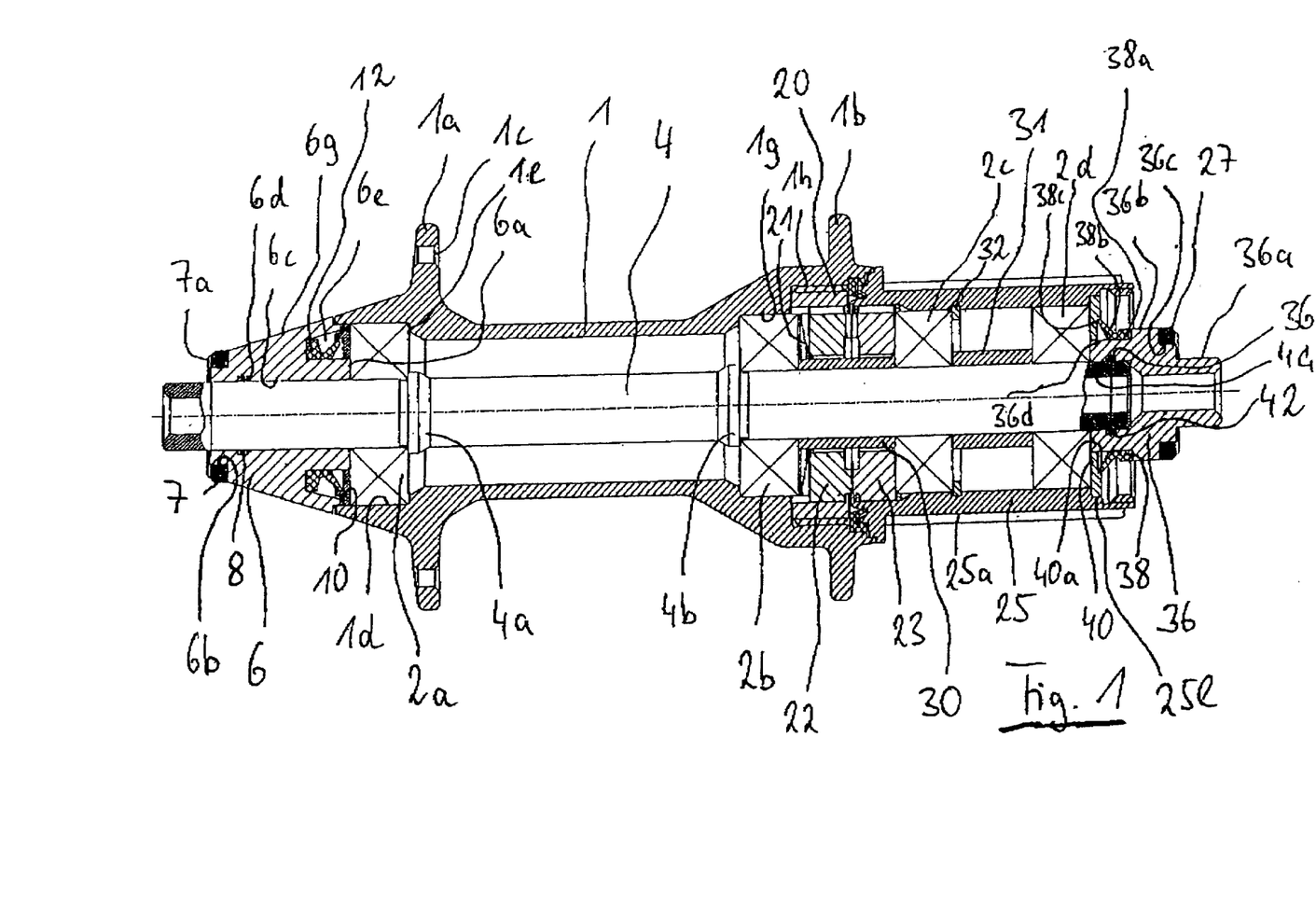
FIG. 1 an embodiment of a hub for a rear wheel in accordance with the present invention.

FIG. 1 shows hub housing 1 in a sectional view, said housing provided with flanges 1a and 1b having bores at 1c for the receiving of spokes.

In virtually all bicycles, the pinion for the drive, respectively the derailleur pinion assemblage, is arranged on the right side of a bicycle with respect to direction of travel. Accordingly, the following will also refer to the left and right sides of the hub, whereby the orientation of FIG. 1 corresponds to the right.

In the left section of the hub, the housing comprises a cylindrical bearing bore 1d, opened facing away from the hub center and in which a conventional grooved ball bearing 2 is disposed, shown only schematically in the drawing. The outer ball race of the grooved ball bearing is supported by cylindrical bearing bore 1d and the inner ball race by axle 4. In the present embodiment, said axle 4 is made of steel and is disposed with encircling stopper 4a at which the inner ball race of said roller bearing 2 positions to be non-displaceable.

Said roller bearing is retained in this position by a left stopper element 6, which is configured to be substantially rotationally symmetrical and having a conical exterior which increases in diameter toward the hub center and with its interior of cylindrical configuration.

A lower annular edge 6a of left stopper element 6 positions at the inner ball race of the roller bearing and does not take part in the rotational movement of the hub body.

A cylindrical shoulder 6b is provided at the end with the smaller diameter intended for the drop-out in mounted state, onto which a toothed disc 7 made of steel is pressed, having gearing 7a earmarked for said drop-out.

An annular groove 6d is provided in cylindrical inner bore 6c of left stopper element 6 in which O-ring 8 is accommodated. The dimensions of O-ring 8 and groove 6d are conformed to one another such that a frictional force is generated between the O-ring and the axle, inducing the stopper element to be held to the axle, but which can be removed from the axle and then positioned back on the axle without the need for any special tool.

Left stopper element 6 is provided with an encircling slot 6e, which in cross section is of trapezoidal shape, facing said roller bearing, the outer surface 6f of said slot being essentially parallel to the outer surface 6g of the stopper element and the inner surface 6h of said slot being configured as cylindrical and rotationally symmetrical to axle 4, whereby said outer surface 6f and said inner surface 6h are connected by an annular surface 6i running perpendicular to axle 4.

A stopper ring 10 is disposed between cylindrical stopper element 6h of said trapezoidal recess and the cylindrical recess 1d of the hub body, which positions on the outer ball race of the roller bearing and on surface 1d and rotates together with same.

Contact ring 10 has an encircling projection 10a which projects into the recess, which is limited inwardly by a cylindrical surface rotationally symmetrical to the axle and outwardly by a conical surface running parallel to surface 6f and to outer surface 6g of the stopper. Both of said surfaces are connected by a surface extending perpendicular to axle 4.

An essentially V-shaped elastomer seal is disposed within trapezoidal recess 6e, wherein the seal is such configured that one arm of the V is of rectangular configuration and positions on the surfaces of said recess 6i and the cylindrical surface 6h, and wherein the second arm of the V is inclined at an acute angle relative the inner cylindrical surface and tapers upwardly. The opening of the V points radially outward. The tapered tip 12b of said second arm of the V forms a lip seal, its upper narrow surface supported at projection 10a of disc 10.

A labyrinth seal is created by means of stopper element 6, hub body 1 and ring 10 as well as projection 10a. Seal gap 13a is perpendicular to axle 4 and limited by a front surface 6j of stopper element 6 and by a front surface 1e of the hub body. A cylindrical surface 6k is provided at a right angle to surface 6j which, together with cylindrical surface 1f, limits seal gap 13b and extends perpendicular to seal gap 13a and hence parallel to the axle. A further annular surface 6l adjoins cylindrical surface 6k, which extends perpendicular to axle 4 and, together with the upper section of ring 10, the surface of which is likewise perpendicular to the axle, limits seal gap 13c running perpendicular to the axle.

A surface 6j outwardly limiting recess 6e is arranged at an obtuse angle to surface 6k, which together with the likewise outwardly facing surface 10a of the projection of ring 10 limits seal gap 13d extending at an obtuse angle to gap 13c.

The function of this part of the hub is as follows:

When mounting, axle 4 is inserted into hub body 1. Roller bearing 2a is then slid onto the axle with its inner ball race positioning at stopper 4a and its outer ball race at stopper 1b of the hub body.

Subsequently, ring 10 is slid on and the V-shaped seal as well as the O-ring 6d inserted into stopper element 6. The stopper is then positioned on the axle and secures the roller bearing.

In order to perform maintenance on the roller bearing, only element 6 needs to be removed for the roller bearing to then be freely accessible and removable from the axle.

The labyrinth-type seal, formed by gaps 13a, b, c, d, prevents the infiltration of water and dirt to a great degree. Since the sealing works without contact, there is, no friction. Due to the multiple deflections of the seal gap, it is not possible for even a direct impact of a stream of water from a high-pressure cleaner to penetrate into recess 6e.

In the event that water does actually enter into recess 6e, the contacting elastomer seal reliably prevents same from advancing on to the bearing. Due to the special protection afforded the elastomer seal by the labyrinth seal, there is no direct penetration of water into recess 6e and thus neither is there any pressuring of lip 12b from a jet of water. Therefore, lip 12b can be configured to be of less elasticity and less pressure strength than would otherwise be possible, further decreasing the friction between the lip and the ring as a result.

Should water penetrate into recess 6e despite the labyrinth seal, this water is expelled back out by the centrifugal action of the ring and the rotating sides of the seal gap.

Figure 2A:
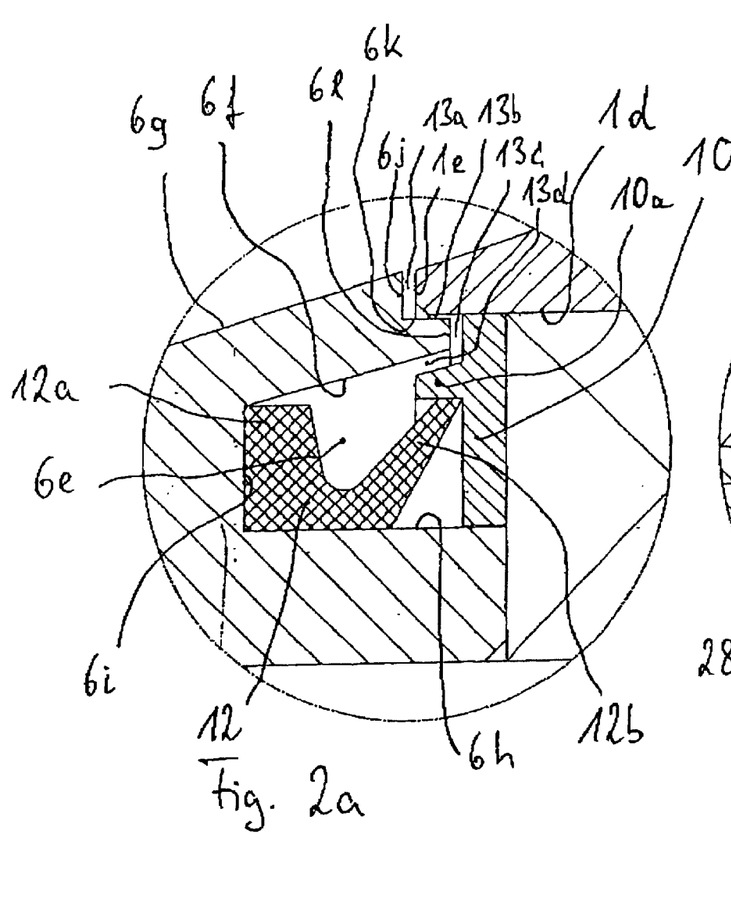
FIG. 2a an enlarged detail view of the representation according to FIG. 1.
Figure 2B:
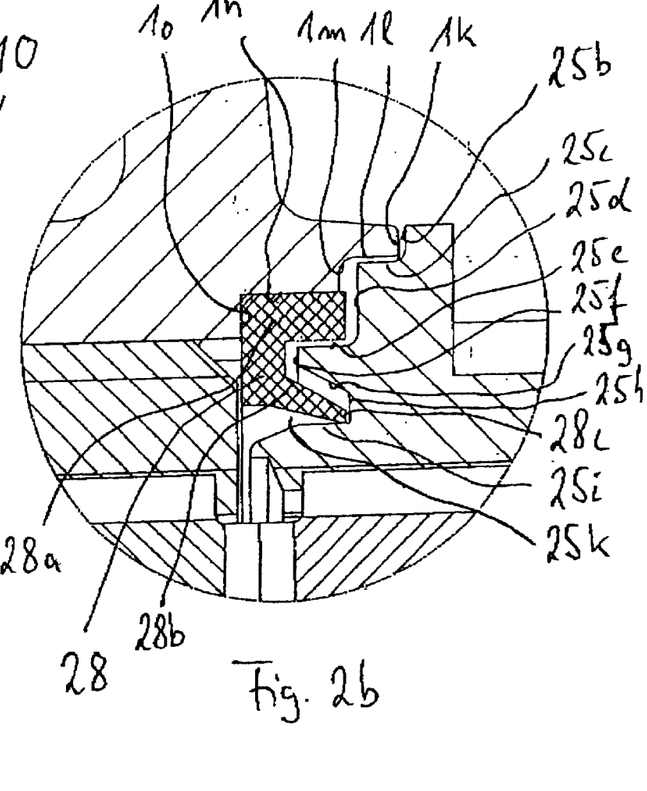
FIG. 2b an enlarged detail view of the representation according to FIG. 1.

In a variation of the present embodiment, which has been described with reference to FIGS. 1, 2a and 2b, it is also possible to omit ring 10 and/or ring 40. In this case, the sealing is found directly on the ball race of the respective roller bearing. This configuration has the disadvantage that it does not have the correspondingly good sealing effect as in the embodiment according to FIGS. 2a and 2b, but on the other hand, it does in contrast have an advantage in that the related expenditure is less since rings 10 and 40 are no longer necessary and also since the weight and the assembly effort as a whole is less.

A cylindrical recess 1g is disposed at the hub's right side, corresponding to cylindrical recess 1d and accommodating a roller bearing 2b, corresponding to roller bearing 2a. In corresponding manner, a stopper 4b is also provided for supporting the inner ball race of the roller bearing.

A threaded ring 20 is screwed into a further cylindrical shoulder 1h, the diameter of which is greater than shoulder 1g, and which forms a freewheel in conjunction with a spring 21, a first toothed disc 22 and a second toothed disc 23, as will be described later.

A rotor 25 is subsequently provided on hub body 1 having gearing 25a which engages in the correspondingly configured recess of a (not shown) pinion assemblage.

Rotor 25 is likewise made of aluminum or another light metal alloy such as titanium, etc. During the drive motion, the rotor rotates at the same speed as hub body 1 and remains stationary when the crank drive is at standstill so that hub body 1 then moves relative to rotor 25.

The rotor is braced against axle 4 by roller bearing 2c and roller bearing 2d, whereby said roller bearings in turn have the same dimensions as roller bearings 2a and 2b.

Figure 3:
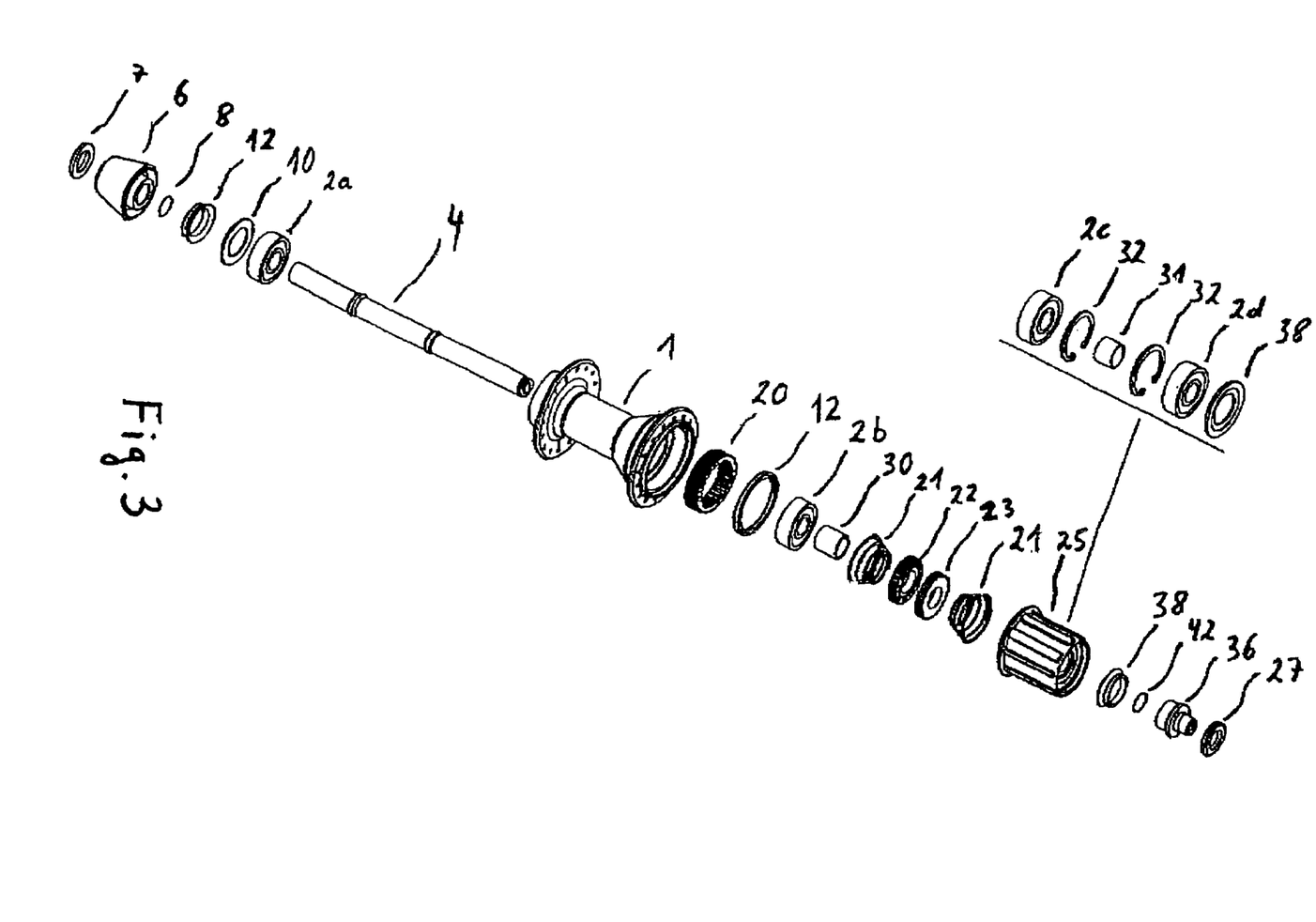
FIG. 3 a perspective exploded drawing of a further embodiment of an inventive hub.

FIG. 3 shows a further embodiment of the hub according to the present invention in an exploded perspective view. Accommodated on axle 4, from the left, is a ball bearing 2a, a cover ring 10, a seal 12, an O-ring 8 and terminal stopper 6 with knurled disc 7. Following insertion into hub housing 1, threaded ring 20 is screwed into hub housing 1 from the right, and then seal 12, ball bearing 2b and spacer sleeve 30 are introduced into said hub housing.

Coil spring 21 supports the floating mounting of toothed disc 22 so that same may be tilted relative the axial line of axle 4 and axially displaceable against the force of coil spring 21.

The teeth of toothed disc 22 are directed to adjacent toothed disc 23 at its right, the teeth of toothed disc 23 correspondingly directed toward toothed disc 22.

Toothed disc 23 is full floating-mounted by a further coil spring 21 and can likewise be tilted relative the axial line of axle 4.

The two coil springs 21 press toothed discs 22 and 23 together and the full floating support afforded by coil springs 21 enables said discs to tilt together jointly with respect to the axial line of axle 4.

Flexible coil springs 21 induce a full floating support of toothed discs 22 and 23 such that upon a slight tilting of one toothed disc, the other toothed disc is likewise correspondingly tilted at the same time and thus ensures a flat contact of the teeth sides of the tooth discs. This enables as many teeth as possible on both toothed discs to be in constant engagement when forward rotational force is transferred.

Also, the use of two springs results in less loading on each individual spring and additionally in greater acceleration at the outset, so that engagement of the toothed discs' teeth transpires faster.

A ball bearing 2c, a retaining ring 32, a spacer sleeve 31, another retaining ring 32, a ball bearing 2d and a cover disc 38 are arranged in rotor 25.

Furthermore, arranged from the right, is seal 38, an O-ring 42, terminal stopper 36 and knurled disc or gearwheel 27.

Figure 4A:
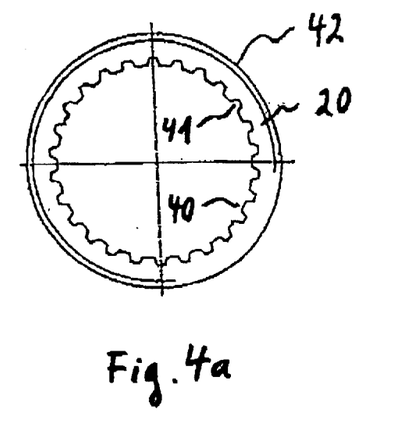
FIG. 4a a view of a threaded ring according to the embodiment of FIG. 3.

FIG. 4a represents a view of a threaded ring which in the embodiment as depicted is made of aluminum alloy and its surface has been tempered in a surface treatment procedure. In addition to hardening with nicotine (in German: Nikotieren) or anodizing, other surface tempering procedures known in the prior art are also possible.

Threaded ring 20 is of cylindrical shape. Threading 42 is shown on the outer surface while teeth 40 and recesses 41 between said teeth are shown on the inner circumference.

Figure 4B:
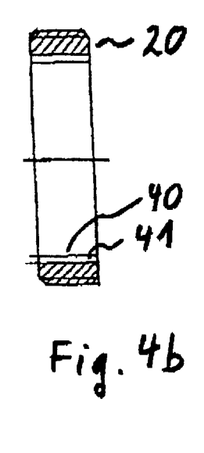
FIG. 4b a cross section of a threaded ring according to the embodiment of FIG. 3.

FIG. 4b depicts a cross section through a threaded ring 20. A threading 42 is arranged across the entire outer surface, while teeth 40 and recesses 41 are disposed across the longitudinal extension.

Figure 5A:
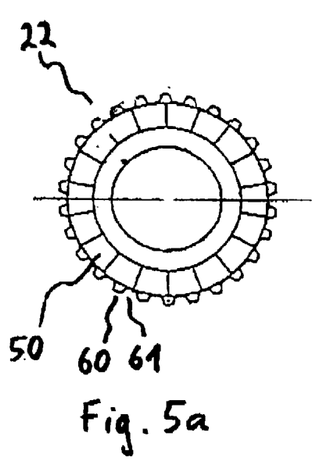
FIG. 5a a view of a toothed disc from the embodiment according to FIG. 3.

FIG. 5a represents a view of a toothed disc 22 or 23.

Radial projections 60 and recesses 61 between said radial projections are distributed evenly across the circumference. The present embodiment employs 26 projections to form a radial gearing.

Figure 5B:
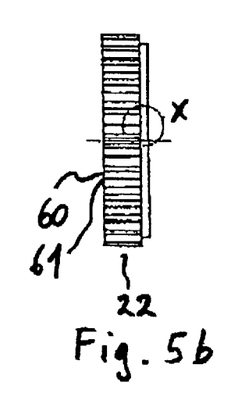
FIG. 5b a side view of a toothed disc according to the embodiment of FIG. 3.

FIG. 5b represents a side view of the toothed disc according to FIG. 5a. Radial projections 60 and recesses 61 are arranged distributed across the circumference.

Figure 5C:
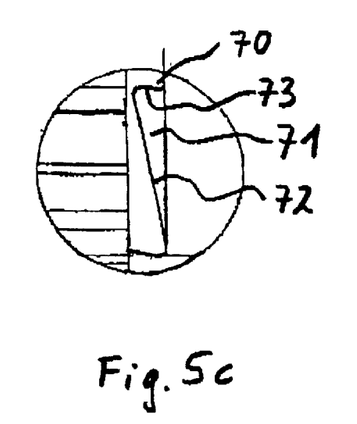
FIG. 5c an enlarged detail view of the representation according to FIG. 5b.

FIG. 5c shows an enlarged detail view of X from FIG. 5b. The teeth of toothed disc 70 have a vertical rise of just under 1 mm compared to the deepest point of recess 71.

The angle between inclines 72 and the center axis of the toothed disc amounts to approximately 79.2° and the angle of inclines 73 to the center axis is roughly 10°. The angles as given are to be considered as guidelines and in other embodiments may vary by up to 10°.

A rotor 25 having a gearing 25a is subsequently disposed on hub body 1 which engages in the correspondingly configured recess of a (not shown) pinion assemblage.

Rotor 25 is likewise made of aluminum or another light metal alloy such as titanium, etc. During the drive motion, the rotor rotates at the same speed as hub body 1 and remains stationary when the crank drive is at standstill so that hub body 1 then moves relative to rotor 25.

The rotor is braced against axle 4 by roller bearing 2c and roller bearing 2d, whereby said roller bearings in turn have the same dimensions as roller bearings 2a and 2b.

A labyrinth seal with downstream elastomer seal is configured between hub body 1 and rotor 25, which will now be described with reference to FIG. 3.

Hub body 1 has an annular wall 1k running perpendicular to axle 4, at which a cylindrical wall 1l extending parallel to the axle adjoins at an angle of 90°. A further annular surface 1m adjoins perpendicularly in turn thereto, which likewise passes at 90° into a cylindrical region 1n, and then adjoined by vertical wall 1o. Said annular wall 1o and cylindrical wall 1n encircle a recess in which an elastomer seal 28 is accommodated. Said elastomer seal is of V-shaped configuration and has an essentially rectangular cross-sectional portion 28a which forms an arm of the V and an adjoining portion 28b coming to a point, of which the front tip 28c forms a lip seal.

At the contact point with the hub body, the rotor has (as seen radially inwardly) a vertically arranged annular area (previously gearing) 25a, a cylindrical outer surface 25b arranged at an angle of 90° thereto facing said rotor, another annular surface 25c, a cylindrical outer surface 25d adjoining thereto and then another annular surface 25e.

A conical surface 25f is subsequently provided adjoining annular surface 25e at an obtuse angle in cross section to which annular surface 25g adjoins, at which in turn a conically extending wall 25h in cross section adjoins at an obtuse angle.

Walls 25f, 25h enclose a recess 25i. A seal 28 engages in said recess 25i such that the tip 28c of one of the arms of the V rests on surface 25h. Said surfaces 1k, 1l, 1m together with each respectively facing surface 25a, 25b, 25c form a labyrinth seal.

The function of this seal and the downstream elastomer seal corresponds to the previously described function of the seal at left stopper element 6. Since this part of the hub is protected by the pinion assemblage when in operation, fewer deviations of course are necessary here for the labyrinth seal as with left stopper element 6. In the left part of the hub as well, fluids are expelled in like manner outward upon rotation, whereby with this seal, in contrast to the seal in stopper element 6, the elastomer seal itself also rotates with the rest and thus any liquid adhering to same is likewise expelled outward due to centrifugal force.

Bearings 2b and 2c are kept at a distance from one another by cylindrical ring 30. A corresponding cylindrical ring 31 is disposed between bearing 2c and bearing 2d arranged at the extreme right. In order to retain the outer ring of bearing 2c with respect to the rotor, a retaining ring 32 is provided, supported on the outer ball race of bearing 2c.

A right stopper element 36 is provided on the right side of the hub consisting of a cylindrical shoulder 36a which is accommodated in the drop-out and a cylindrical shoulder 36b of larger diameter having a further cylindrical shoulder 36c, in which a gearwheel 27 made of steel is accommodated in the same manner as with the left stopper element and which supports the stopper element at the drop-out.

A further cylindrical shoulder 36d having a somewhat smaller diameter as shoulder 36b, is disposed adjacent to cylindrical surface 36b in the direction of hub body 1, in which seal 38 is accommodated. This elastomer seal has a ring as its base body with an essentially rectangular cross section 38a, from which sealing lip 38b extends radially outwardly at an angle of about 45° and on to form tip 38c.

Tip 38c is supported at stopper ring 40 which is retained in a cylindrical recess 25k of rotor 25 and has a cylindrical radial shoulder 40a extending parallel to axle 4a and on which surface 38c of the front portion of seal 38 positions.

In the same manner as with the left stopper element, a groove 36e is provided for the right stopper element which receives an O-ring seal 42. Said O-ring seal is dimensioned with respect to groove 36e such that it holds the right stopper element to the axle by means of friction.

The assembly of the right part of the hub corresponds substantially to the assembly of the left part: the roller bearing 2b, the fitting for the freewheel and the roller bearing 2c are slid onto the axle. The rotor with retaining ring is then positioned and the cylindrical ring 31 and roller bearing 2d follow as does ring 40. Then the stopper element with the seal can be slipped on and held by the frictional force of the O-ring. A special tool or a bolting of the individual parts to one another is not required.

For mounting on the bicycle, a conventional quick-release or other corresponding mounting device is inserted into the longitudinal bore 4c of the axle and the hub is affixed to the bicycle in such a manner than the inner surfaces of the drop-out abut against toothed discs 7 and 37. In this manner, the hub is held together reliably during operation.

What is claimed is:

1. Hub, for bicycles having
   a hub axle,
   a hub housing arranged essentially concentric to said hub axle,
   at least one bearing means comprising at least two bearings and which is arranged essentially between said hub axle and said hub housing so that said hub housing is mounted rotatably relative said hub axle,
   a rotor mounted rotatably relative said hub axle which is configured such that at least one gearwheel may be arranged thereon,
   a freewheel device arranged between said rotor and said hub housing and comprising two toothed discs, their toothed surfaces pressed together by means of a pre-tensioning device,
   wherein said two toothed discs are arranged essentially concentric to said hub axle and upon said hub being assembled accordingly are arranged substantially in a plane perpendicular to an axial line of said hub axle, at least in the state of rest, and
   wherein said toothed discs are retained in a floating mounting so that a tilting perpendicular to said axial line of said hub axle in relation to the plane is possible, and
   wherein said pre-tensioning device comprises at least two springs, and wherein said pre-tensioning device urges each of said adjacent two toothed discs together from both exterior sides with at least one respective spring.

2. Hub according to claim 1, wherein said toothed discs are exchangeable and no tools are needed.

3. Hub according to claim 1, wherein at least one of said springs of said pre-tensioning device is configured as a coil spring.

4. Hub according to claim 1, wherein one of said springs of said pre-tensioning device supports a floating mounting of one toothed disc so that said toothed disc is axially displaceable against the force of said spring and tiltable relative said plane perpendicular to said axial line of said axle.

5. Hub according to claim 1, wherein the at least two springs of said pre-tensioning device support the floating mounting of said two toothed discs.

6. Hub according to claim 1, wherein a plurality of teeth are arranged at least on the facing disc surfaces of said toothed discs, wherein the number of said teeth is between 2 and 48.

7. Hub according to claim 6, wherein said plurality of said teeth are arranged on an annular section of said disc surface of said toothed disks.

8. Hub according to claim 6, wherein said two toothed disks are essentially identical or are manufactured such that in the case of two toothed discs arranged with directly adjacent tooth surfaces, at least a portion of the teeth of said first toothed disc comes into contact with recesses between said teeth of said second toothed disc.

9. Hub according to claim 6, wherein said toothed discs have a differing number of teeth.

10. Hub according to claim 6, wherein said toothed discs have an identical number of teeth.

11. Hub according to claim 1, wherein when said tooth surfaces of said two toothed discs are engaged, said toothed discs are essentially in contact over a major portion of the disc surfaces.

12. Hub according to claim 1, wherein at least one of said toothed discs has a plurality of projections distributed radially about the circumference of same, which exhibit in the radial direction a rectangular, sinusoidal, trapezoidal or toothed-shaped cross section in a plane of said disc surface.

13. Hub according to claim 12, wherein one of said toothed discs is arranged in a substantially concentric bore or opening in the rotor aligning to the center of the hub and non-rotatable relative said rotor in the corresponding assembly and that said opening is configured such that said projections of said toothed discs extend into the radial recesses of said rotor.

14. Hub according to claim 12, wherein a threaded ring is screwed into said hub housing in a substantially concentric bore of said hub housing aligning to said rotor in the corresponding assembly, having a bore in which a toothed disc is arranged essentially non-rotatable relative said hub housing, and that said bore in said threaded ring is configured such that said projections of said toothed disc project into the radial recesses of said threaded ring.

15. Hub according to claim 1, wherein said toothed discs have a plurality of teeth that are evenly distributed circumferentially.

16. Hub according to claim 15, wherein selected ones of the plurality of teeth are circumferentially omitted.

17. Hub according to claim 15, wherein the circumferential spacing between adjacent ones of the plurality of teeth varies.

18. Hub according to claim 1, wherein said rotor is removable manually without the need for any tools.

19. Hub according to claim 14, wherein said threaded ring is made of a metal alloy.

20. Hub according to claim 1, wherein a sealing means is provided which greatly prevents the infiltration of water and dirt into the bearing means.

21. Hub according to claim 20, wherein said sealing means comprises at least one labyrinth seal.

22. Hub according to claim 20, wherein said sealing means comprises at least one elastomer seal.

23. Wheel, for bicycles, having a hub having
    a hub axle,
    a hub housing arranged essentially concentric to said hub axle,
    at least one bearing means comprising at least two bearings and which is arranged essentially between said hub axle and said hub housing so that said hub housing is mounted rotatably relative said hub axle,
    a rotor mounted rotatably relative said hub axle which is configured such that at least one gearwheel may be arranged thereon,
    a freewheel device arranged between said rotor and said hub housing and comprising two toothed discs, their toothed surfaces pressed together by means of a pre-tensioning device,
    wherein said two toothed discs are arranged essentially concentric to said hub axle and upon said hub being assembled accordingly are arranged substantially in a plane perpendicular to an axial line of said hub axle, at least in the state of rest, and
    wherein said toothed discs are retained in a floating mounting so that a tilting perpendicular to said axial line of said hub axle in relation to the plane is possible,
    wherein said pre-tensioning device comprises at least two springs, and wherein said pre-tensioning device urges each of said adjacent two toothed discs together from both exterior sides with at least one respective spring.

24. Multi-wheel, having at least one hub having
a hub axle,
a hub housing arranged essentially concentric to said hub axle,
at least one bearing means comprising at least two bearings and which is arranged essentially between said hub axle and said hub housing so that said hub housing is mounted rotatably relative said hub axle,
a rotor mounted rotatably relative said hub axle which is configured such that at least one gearwheel may be arranged thereon,
a freewheel device arranged between said rotor and said hub housing and comprising two toothed discs, their toothed surfaces pressed together by means of a pre-tensioning device, wherein said two toothed discs are arranged essentially concentric to said hub axle and upon said hub being assembled accordingly are arranged substantially in a plane perpendicular to an axial line of said hub axle, at least in the state of rest, and wherein said toothed discs are retained in a floating mounting so that a tilting perpendicular to said axial line of said hub axle in relation to the plane is possible, wherein said pre-tensioning device comprises at least two springs, and wherein said pre-tensioning device urges each of said adjacent two toothed discs together from both exterior sides with at least one respective spring.

* * * * *